US011623988B2

(12) United States Patent
Lee et al.

(10) Patent No.: US 11,623,988 B2
(45) Date of Patent: Apr. 11, 2023

(54) POLYPHENYLENE SULFIDE RESIN COMPOSITION, METHOD OF PREPARING POLYPHENYLENE SULFIDE RESIN COMPOSITION, AND INJECTION-MOLDED ARTICLE MANUFACTURED USING POLYPHENYLENE SULFIDE RESIN COMPOSITION

(71) Applicant: LG CHEM, LTD., Seoul (KR)

(72) Inventors: Hyun Jin Lee, Daejeon (KR); Myong Jo Ham, Daejeon (KR); Soongin Kim, Daejeon (KR); Eon Seok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 393 days.

(21) Appl. No.: 16/957,969

(22) PCT Filed: Nov. 14, 2019

(86) PCT No.: PCT/KR2019/015566
§ 371 (c)(1),
(2) Date: Jun. 25, 2020

(87) PCT Pub. No.: WO2020/130365
PCT Pub. Date: Jun. 25, 2020

(65) Prior Publication Data
US 2020/0369884 A1 Nov. 26, 2020

(30) Foreign Application Priority Data

Dec. 18, 2018 (KR) .................. 10-2018-0164012

(51) Int. Cl.
| | |
|---|---|
| C08L 81/02 | (2006.01) |
| C08K 3/22 | (2006.01) |
| B29C 45/14 | (2006.01) |
| C08G 75/0204 | (2016.01) |
| C08K 3/40 | (2006.01) |
| C08K 5/53 | (2006.01) |
| C08K 5/5415 | (2006.01) |
| C08K 7/14 | (2006.01) |
| C08K 9/06 | (2006.01) |

(52) U.S. Cl.
CPC .............. *C08L 81/02* (2013.01); *B29C 45/14* (2013.01); *C08G 75/0204* (2013.01); *C08K 3/22* (2013.01); *C08K 3/40* (2013.01); *C08K 5/53* (2013.01); *C08K 5/5415* (2013.01); *C08K 7/14* (2013.01); *C08K 9/06* (2013.01); *C08K 2003/2248* (2013.01)

(58) Field of Classification Search
CPC .... C08L 81/02; C08K 3/22; C08K 2003/2248
See application file for complete search history.

(56) References Cited

U.S. PATENT DOCUMENTS

| | | | |
|---|---|---|---|
| 2014/0066560 A1 | 3/2014 | Stoppelmann et al. | |
| 2014/0353543 A1 | 12/2014 | Wu et al. | |

FOREIGN PATENT DOCUMENTS

| | | | |
|---|---|---|---|
| CN | 108219630 A | | 6/2018 |
| EP | 2128200 A1 | | 12/2009 |
| JP | 2004-91685 A | | 3/2004 |
| JP | 2006-233101 A | | 9/2006 |
| JP | 2008-266616 A | | 11/2008 |
| JP | 2009030030 A | * | 2/2009 |
| JP | 2013-144767 A | | 7/2013 |
| JP | 2014-74161 A | | 4/2014 |
| JP | 2014-240453 A | | 12/2014 |
| JP | 2017-512853 A | | 5/2017 |
| KR | 10-20150054770 A | | 5/2015 |
| KR | 10-20160016957 A | | 2/2016 |
| KR | 10-2016-0100935 A | | 8/2016 |
| KR | 10-2016-0138176 A | | 12/2016 |
| KR | 10-20170024455 A | | 3/2017 |
| KR | 10-20170099296 A | | 8/2017 |
| KR | 10-2017-0106296 A | | 9/2017 |
| KR | 10-2017-0129331 A | | 11/2017 |
| KR | 10-2018-0026764 A | | 3/2018 |
| WO | 2014/042283 A1 | | 3/2014 |
| WO | 2017/017660 A1 | | 2/2017 |
| WO | 2018130970 A1 | | 7/2018 |
| WO | 2018130972 A1 | | 7/2018 |
| WO | 2018/178128 A1 | | 10/2018 |

OTHER PUBLICATIONS

Machine translation of JP 2009-030030 A, published Feb. 12, 2009, <<retrieved from https://worldwide.espcanet.com on Sep. 16, 2022>>.*
Kim et al., "Laser direct structuring and electroless plating applicable super-engineering plastic PPS based thermal conductive composite with particle surface modification", RSC Advances, vol. 8, pp. 9933-9940 (2018).

* cited by examiner

*Primary Examiner* — Vickey Nerangis
(74) *Attorney, Agent, or Firm* — Dentons US LLP

(57) ABSTRACT

A polyphenylene sulfide resin composition including (a) 25% to 75% by weight of a base resin; (b) 0.1% to 10% by weight of a laser direct structuring (LDS) additive; (c) 0.1% to 5% by weight of a plating seed generation promoter; (d) 10% to 60% by weight of a glass fiber; and (e) 0% to 40% by weight of a mineral filler, based on a total weight of the polyphenylene sulfide resin composition. The base resin includes 95% by weight or more of a polyphenylene sulfide resin based on a total weight of the base resin. A method of preparing the polyphenylene sulfide resin composition, and an injection-molded article manufactured using the polyphenylene sulfide resin composition.

14 Claims, 1 Drawing Sheet

LASER RADIATION    FORMATION OF ADHESIVE SURFACE    FORMATION OF CONDUCTIVE METAL LAYER

◎ :

○ :

X :

POLYPHENYLENE SULFIDE RESIN COMPOSITION, METHOD OF PREPARING POLYPHENYLENE SULFIDE RESIN COMPOSITION, AND INJECTION-MOLDED ARTICLE MANUFACTURED USING POLYPHENYLENE SULFIDE RESIN COMPOSITION

CROSS-REFERENCE TO RELATED APPLICATION

This application is a U.S. national stage of international Application No. PCT/KR2019/015566, filed Nov. 14, 2019, and claims priority to Korean Patent Application No. 10-2018-0164012, filed on Dec. 18, 2018 in the Korean Intellectual Property Office, the disclosures of which are incorporated herein by reference.

TECHNICAL FIELD

The present invention relates to a polyphenylene sulfide resin composition, a method of preparing the polyphenylene sulfide resin composition, and an injection-molded article manufactured using the polyphenylene sulfide resin composition. More specifically, the present invention relates to a polyphenylene sulfide resin composition for laser direct structuring (LDS) having excellent plating adhesion and plating precision and low dielectric loss without deterioration in intrinsic properties, such as heat resistance, flame retardancy, and dimensional stability, of a polyphenylene sulfide resin, a method of preparing the polyphenylene sulfide resin composition, and an injection-molded article manufactured using the polyphenylene sulfide resin composition.

BACKGROUND ART

Recently, laser direct structuring (hereinafter referred to as 'LDS') technology has attracted attention. According to LDS technology, the surface of an injection-molded article including an LDS additive is activated by a laser beam, and the activated portion is plated to form a conductive pattern layer.

In general, an injection-molded article is manufactured by mixing a thermoplastic resin and an LDS additive and extruding and injecting the mixture. In this case, a plating seed is formed only in a region patterned by a laser beam, and as a result, a plating is formed on the patterned region. Examples of injection-molded articles manufactured by this method include antennas, circuits, and the like.

When a general-purpose engineering plastic is used as a thermoplastic resin, a product manufactured using the general-purpose engineering plastic may be deformed at high temperature, generating discontinuities in a plated portion. As a result, the function of the product may be lost.

In addition, a polyphenylene sulfide resin having excellent heat resistance has a limitation in being used as a thermoplastic resin in development of LDS materials due to interference of plating seed formation by a sulfone group. To solve these problems, alloy materials prepared by mixing a polyphenylene sulfide resin and other resins, such as polyethylene terephthalates, polybutylene terephthalates, polyamides, and liquid crystal polymers, have been suggested. However, when the alloy materials prepared by such a method are used, a plating seed is formed, but the intrinsic properties of a polyphenylene sulfide resin are greatly degraded and dielectric loss is increased. In addition, when the ambient temperature changes significantly, deformation may occur due to differences in glass transition temperature, melting temperature, and shrinkage between resins, causing discontinuities in a plated portion.

Therefore, there is a need for development of an LDS material that promotes plating seed generation and prevents occurrence of discontinuities in a plated portion without deterioration in the intrinsic properties of a polyphenylene sulfide resin.

[Relevant Patent] KR 2017-0024455 A

SUMMARY

The present invention has been made in view of the above problems, and it is one object of the present invention to provide a polyphenylene sulfide resin composition for laser direct structuring (LDS) having excellent plating adhesion and plating precision and low dielectric loss without deterioration in the intrinsic properties, such as heat resistance, flame retardancy, and dimensional stability, of a polyphenylene sulfide resin, a method of preparing the polyphenylene sulfide resin composition, and an injection-molded article manufactured using the polyphenylene sulfide resin composition.

The above and other objects can be accomplished by the present disclosure described below.

In accordance with one aspect of the present invention, provided is a polyphenylene sulfide resin composition including (a) 25% to 75% by weight of a base resin including 95% by weight or more of a polyphenylene sulfide resin; (b) 0.1% to 10% by weight of an LDS additive; (c) 0.1% to 5% by weight of a plating seed generation promoter; (d) 10% to 60% by weight of a glass fiber; and (e) 0% to 40% by weight of a mineral filler.

In accordance with another aspect of the present invention, provided is a method of preparing a polyphenylene sulfide resin composition, the method including melt-kneading and extruding (a) 25% to 75% by weight of a base resin including 95% by weight or more of a polyphenylene sulfide resin; (b) 0.1% to 10% by weight of an LDS additive; (c) 0.1% to 5% by weight of a plating seed generation promoter; (d) 10% to 60% by weight of a glass fiber; and (e) 0% to 40% by weight of a mineral filler.

In accordance with yet another aspect of the present invention, provided is an injection-molded article including the polyphenylene sulfide resin composition.

As apparent from the foregoing, the present invention advantageously provides a polyphenylene sulfide resin composition for laser direct structuring (LDS), a method of preparing the polyphenylene sulfide resin composition, and an injection-molded article manufactured using the polyphenylene sulfide resin composition. According to the present invention, the polyphenylene sulfide resin composition has excellent plating adhesion and plating precision and low dielectric loss without deterioration in the intrinsic properties, such as heat resistance, flame retardancy, and dimensional stability, of a polyphenylene sulfide resin. In addition, since the polyphenylene sulfide resin composition does not include other kinds of resins or includes a small amount of other kinds of resins, occurrence of discontinuities in a plated portion can be prevented.

DETAILED DESCRIPTION

Figure 1:
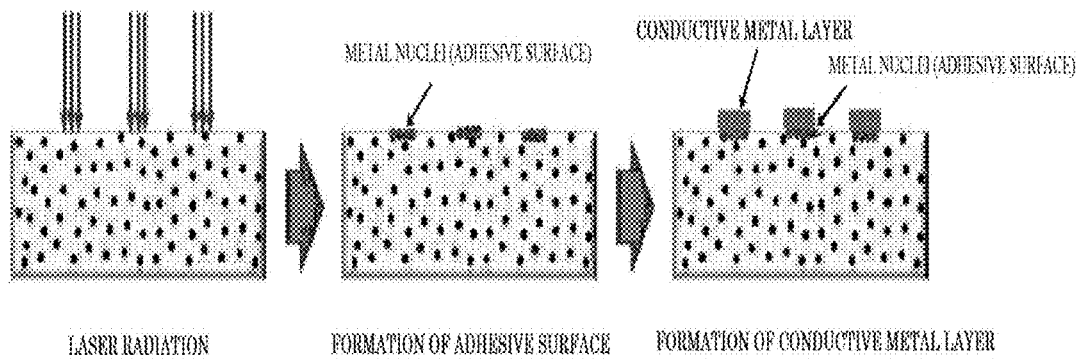
FIG. 1 is a schematic illustration of a process of forming a plating on the surface of an injection-molded article using laser direct structuring (LDS) technology according to an exemplary embodiment.

Hereinafter, a polyphenylene sulfide resin composition, a method of preparing the polyphenylene sulfide resin composition, and an injection-molded article manufactured using the polyphenylene sulfide resin composition according to the present invention will be described in detail.

In general, when a general-purpose engineering plastic is used as a resin for LDS, a product manufactured using the general-purpose engineering plastic is deformed at high temperature, generating discontinuities in a plated portion. As a result, the function of the product is lost. To solve these problems, when a polyphenylene sulfide resin having good heat resistance is used, due to interference of plating seed formation by the sulfone group thereof, a plating is not formed effectively, and the intrinsic properties of a polyphenylene sulfide resin are degraded. Therefore, to overcome these limitations, the present inventors conducted studies. As a result, the present inventors confirmed that, when a base resin including 95% or more of a polyphenylene sulfide resin was mixed with a predetermined LDS additive, a plating seed generation promoter, and glass fiber in a specific composition ratio, the above problems were solved. Based on these results, the present inventors conducted further studies to complete the present invention.

The polyphenylene sulfide resin composition of the present invention includes (a) 25% to 75% by weight of a base resin including 95% by weight or more of a polyphenylene sulfide resin, (b) 0.1% to 10% by weight of an LDS additive, (c) 0.1% to 5% by weight of a plating seed generation promoter, (d) 10% to 60% by weight of a glass fiber, and (e) 0% to 40% by weight of a mineral filler. In this case, a polyphenylene sulfide resin composition for LDS that has excellent plating adhesion and plating precision and low dielectric loss without deterioration in the intrinsic properties, such as heat resistance, flame retardancy, and dimensional stability, of a polyphenylene sulfide resin and prevents occurrence of discontinuities in a plated portion even when ambient temperature changes may be provided.

Hereinafter, each component constituting the polyphenylene sulfide resin composition of the present invention will be described in detail as follows.

(a) Base Resin

For example, the base resin according to the present invention may include 95% by weight or more, preferably 98% by weight or more of a polyphenylene sulfide resin. More preferably, the base resin consists of 100% by weight of a polyphenylene sulfide resin. In this case, the intrinsic properties of a polyphenylene sulfide resin may be well expressed, dielectric loss may be lowered, and occurrence of discontinuities in a plated portion may be prevented even when ambient temperature changes.

For example, the base resin including the polyphenylene sulfide resin composition may be included in an amount of 25% to 75% by weight, 40% to 70% by weight, 50% to 60% by weight, or 52% to 56% by weight. Within this range, the intrinsic properties, such as heat resistance and mechanical properties, of a polyphenylene sulfide resin may be maintained, and plating efficiency, plating adhesion, and plating precision may be improved.

For example, the polyphenylene sulfide resin of (a) may be a linear or branched (cross-linked) polyphenylene sulfide resin, preferably a linear polyphenylene sulfide resin. In this case, plating efficiency may be further improved.

For example, a branched polyphenylene sulfide resin may be prepared through a heat curing process included in a polymerization process. Unlike a branched polyphenylene sulfide resin, a linear polyphenylene sulfide resin may be prepared using an improved polymerization method without a heat curing process. In addition, linear or branched polyphenylene sulfide resins commonly used in the art to which the present invention pertains may be used as the linear or branched polyphenylene sulfide resin of the present invention without particular limitation.

For example, when a melt index is measured under a condition of 315° C./5 kg according to ASTM D1238, the polyphenylene sulfide resin may have a melt index of 100 g/10 min to 2,000 g/10 min, 250 g/10 min to 1,850 g/10 min, or 350 g/10 min to 1,750 g/10 min. Within this range, heat resistance, mechanical properties, plating efficiency, plating adhesion, and plating precision may be excellent.

For example, the base resin may include one or more selected from the group consisting of polyphenylene oxides, polybutylene terephthalates, polyamides, polycarbonates, polystyrenes, polypropylenes, polyethylenes, thermotropic liquid crystal polymers, polyetherimides, and polyethylene terephthalates as the remainder of the base resin when necessary.

For example, the polystyrene may be a syndiotactic polystyrene.

(b) LDS Additive

When an LDS additive included in a polyphenylene sulfide resin is irradiated with a laser beam, metal elements are released or activated to form metal nuclei. These metal nuclei are embedded in a fine size in regions irradiated with electromagnetic waves such as a laser beam, and serve as seeds for crystal growth during a plating process.

The plating process of the present invention including a resin for LDS without particular limitation may be used for preparing a molded article. For example, a copper plating process, a gold plating process, a nickel plating process, a silver plating process, a zinc plating process, or a tin plating process may be used as the plating process of the present invention.

Metal compounds commonly used as LDS additives may be used as the LDS additive according to the present invention without particular limitation. Preferably, the LDS additive of the present invention is an oxide including copper, more preferably a spinel-structured oxide including copper and chromium. In this case, plating properties may be excellent without deterioration in the intrinsic properties of a polyphenylene sulfide.

For example, the oxide including copper and chromium may further include one or more selected from the group consisting of Sb, Cu, Pb, Ni, Fe, Sn, Cr, Mn, Ag, Au, and Co. Preferably, the oxide including copper and chromium is $Cu(Cr, Mn)_2O_4$ containing Mn. In this case, laser sensitivity may be increased, thereby promoting formation of metal nuclei.

For example, the polyphenylene sulfide resin composition may include the LDS additive in an amount of 0.1% to 10% by weight, 1% to 10% by weight, 2% to 8% by weight, or 3% to 7% by weight. Within this range, laser sensitivity and plating properties may be improved without deterioration of the intrinsic properties of the base resin.

(c) Plating Seed Generation Promoter

The plating seed generation promoter according to the present invention may assist in maintaining the intrinsic properties, such as heat resistance, flame retardancy, and dimensional stability, of a polyphenylene sulfide resin, may reduce dielectric loss, and may prevent occurrence of discontinuities in a plated portion due to change in ambient temperature.

For example, the plating seed generation promoter according to the present invention is a material for promoting generation of a plating seed, and may be a polyol-based plating seed generation promoter. Preferably, the plating seed generation promoter may be a polyol having 4 or more hydroxyl groups, 4 to 20 hydroxyl groups, 4 to 10 hydroxyl groups, or 6 to 8 hydroxyl groups. In this case, generation of a plating seed may be greatly promoted, and metal ions may be activated due to removal of an oxide group.

For example, the polyol may be an ether polyol. In this case, generation of a plating seed may be greatly promoted, and metal ions may be activated due to removal of an oxide group.

In this specification, polyols may be classified into polyhydric alcohols in which several hydrogens of a hydrocarbon are substituted with hydroxyl groups, ether polyols including ether groups, and ester polyols including ester groups. The plating seed generation promoter according to the present invention is preferably a polyhydric alcohol or an ether polyol, more preferably an ether polyol. In this case, generation of a plating seed may be greatly promoted, and metal ions may be activated due to removal of an oxide group.

For example, the polyphenylene sulfide resin composition may include the plating seed generation promoter in an amount of 0.1% to 5% by weight, 0.2% to 3% by weight, 0.3% to 2% by weight, or 0.5% to 1% by weight. Within this range, generation of a plating seed may be greatly promoted, thereby increasing plating efficiency.

(d) Glass Fiber

The glass fiber according to the present invention is preferably a glass fiber surface-treated with an epoxy silane-based compound. In this case, compatibility with a polyphenylene sulfide resin may be improved, thereby increasing strength without deterioration of the intrinsic physical properties of a polyphenylene sulfide resin.

For example, the epoxy silane-based compound may be used in an amount of 0.1% to 0.5% by weight based on 100% by weight of a surface-treated glass fiber. Within this range, compatibility may be improved.

Epoxy silane-based compounds commonly used to coat a glass fiber may be used as the epoxy silane-based compound of the present invention without particular limitation. For example, the epoxy silane-based compound may be a compound represented by Formula 1 below.

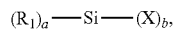
[Formula 1]

wherein $R_1$ represents a group having at least one epoxy group, X is a hydroxyl group or a substituent capable of reacting with water to produce a hydroxyl group, a is an integer of 1 to 3, and b is an integer of 1 to 3, and wherein a and b satisfy the following equation:

$$a+b=4.$$

As another example, the epoxy silane may be a compound represented by Formula 2 below.

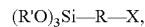
[Formula 2]

wherein R'O represents a methoxy, ethoxy, or acetoxy group, R represents a bond or an alkylene group having 1 to 5 carbon atoms, and X represents an epoxy group.

For example, the glass fiber may have an average diameter of 5 μm to 20 μm and an average length of 1 mm to 10 mm. As another example, the glass fiber may have an average diameter of 8 μm to 15 μm and an average length of 2 mm to 5 mm. Within this range, the strength of a resin composition may be excellent, and the surface roughness of an injection-molded article may be good.

In this specification, the average diameter and average length of a glass fiber may be measured using measurement methods commonly used in the art to which the present invention pertains without particular limitation.

For example, the diameters or lengths of 50 specimens are measured using a scanning electron microscope (SEM), and an average value is calculated from the measured values.

For example, the polyphenylene sulfide resin composition may include the glass fiber in an amount of 10% to 60% by weight, 20% to 50% by weight, 25% to 45% by weight, or 30% to 40% by weight. Within this range, strength may be excellent without deterioration in the intrinsic properties of a base resin.

(e) Mineral Filler

For example, the mineral filler may include one or more selected from the group consisting of glass beads, kaolin, talc, mica, clay, calcium carbonate, calcium silicate, silicon carbide, aluminum oxide, and magnesium oxide. In this case, warping of a product may be prevented, and permittivity may be excellent while strength and heat resistance are maintained at a high level.

Preferably, the mineral filler is coated using a surface treatment agent. In this case, warping of a product may be prevented, and permittivity may be excellent while strength and heat resistance are maintained at a high level.

Surface treatment agents commonly used to coat mineral fillers may be used as the surface treatment agent of the present invention without particular limitation. For example, the surface treatment agent may include fatty acids, aminosilanes, silane compounds, epoxy resins, and acrylic resins.

For example, the mineral filler may have a particle size of 1 μm to 10 μm or 3 μm to 8 μm. In this case, warping of a product may be prevented, and permittivity may be excellent.

In the present invention, the particle size of the mineral filler may be measured using measurement methods commonly used in the art to which the present invention pertains without particular limitation. For example, the particle size of the mineral filler may be measured through microscopic observation. As a specific example, the sizes of 50 specimens are measured using a scanning electron microscope (SEM), and an average value is calculated from the measured values.

For example, the mineral filler may have a spherical shape. Materials classified as spherical mineral fillers in the art to which the present invention pertains may be used as the spherical mineral filler of the present invention without particular limitation. In addition, commercially available spherical mineral fillers may be used.

For example, the polyphenylene sulfide resin composition may include the mineral filler in an amount of 0% to 40% by weight, 1% to 40% by weight, 5% to 20% by weight, or 5% to 15% by weight. Within this range, laser sensitivity and plating properties may be improved without deterioration of the intrinsic properties of the base resin.

Other Additives

For example, other additive according to the present invention may include one or more selected from the group consisting of flame retardants, antioxidants, light stabilizers, chain extenders, reaction catalysts, releasing agents, pigments, dyes, antistatic agents, antimicrobials, processing aids, metal deactivators, fluorine-based anti-dripping agents, inorganic fillers excluding glass fibers and mineral fillers, and friction-resistant and abrasion-resistant agents. The polyphenylene sulfide resin composition may include the additives in an amount of 0.1% to 5% by weight, 0.1% to 2% by weight, or 0.2% to 1% by weight. Within this range, effects desired by the present invention may be achieved.

Method of Preparing Polyphenylene Sulfide Resin Composition

A method of preparing a polyphenylene sulfide resin composition according to the present invention includes a step of melt-kneading and extruding (a) 25% to 75% by weight of a base resin including 95% or more of a polyphenylene sulfide resin, (b) 0.1% to 10% by weight of an LDS additive, (c) 0.1% to 5% by weight of a plating seed generation promoter, (d) 10% to 60% by weight of a glass fiber, and (e) 0% to 40% by weight of a mineral filler. In this case, a polyphenylene sulfide resin composition for LDS having excellent plating adhesion and plating precision and low dielectric loss without deterioration of the intrinsic properties, such as heat resistance, flame retardancy, and dimensional stability, of a polyphenylene sulfide resin may be provided.

For example, the method of preparing the polyphenylene sulfide resin composition may include a step of mixing the components (a) to (d) or the components (a) to (e) using a mixer or a super mixer and melt-kneading and extruding the mixture using a twin-screw extruder, a single-screw extruder, a roll-mill, a kneader, or a Banbury mixer.

For example, the method of preparing the polyphenylene sulfide resin composition may include a step of obtaining pellets by cutting an extrudate using a pelletizer after extruding and a step of drying the pellets using a dehumidifying dryer or a hot air dryer. In this case, processing may be easily performed in the subsequent injection molding step.

For example, the melt-kneading and extruding may be performed at 285° C. to 330° C. or 290° C. to 320° C. and 150 rpm to 500 rpm or 200 rpm to 400 rpm. Within this range, processing may be easily performed without decomposition of components.

Injection-molded Article

An injection-molded article of the present invention includes the above-described polyphenylene sulfide resin composition. In this case, an LDS injection-molded article having excellent plating adhesion and plating precision and low dielectric loss while maintaining the intrinsic properties, such as heat resistance, flame retardancy, and dimensional stability, of a polyphenylene sulfide resin may be provided.

For example, the injection-molded article may be manufactured by injecting the polyphenylene sulfide resin or pellets thereof described above.

For example, after kneading the pellets at 50 rpm to 150 rpm, injection may be performed at 290° C. to 320° C. and 30 bar to 200 bar. In this case, mold temperature may be 100° C. to 140° C. or 110° C. to 130° C.

For example, the injection-molded article may include a conductive pattern layer formed by direct radiation of a laser beam. As a specific example, the injection-molded article may a built-in antenna.

Plating Process

A plating process of forming a conductive pattern layer on the surface of the injection-molded article according to the present invention will be described with reference to FIG. 1.

FIG. 1 schematically illustrates a process of forming a plating on the surface of an injection-molded article using laser direct structuring (LDS) technology. In the present invention, the injection-molded article is a flat substrate in which an LDS additive is uniformly distributed, but does not necessarily need to be a flat substrate, and a part or all of the injection-molded article may be curved.

As illustrated in the first step of FIG. 1, a predetermined region of a substrate on which a conductive pattern is to be formed may be irradiated with electromagnetic waves such as a laser beam. When the region is irradiated with electromagnetic waves in this manner, metal nuclei are formed from an LDS additive present in the irradiated region, as illustrated in the second step of FIG. 1. The metal nuclei form a surface having a higher adhesion than that in plating, that is, an adhesive surface. Since an adhesive surface is selectively formed on a specific region irradiated with electromagnetic waves, when a reduction or plating process to be described later is performed, as illustrated in the third step of FIG. 1, conductive metal ions in an adhesive surface are chemically reduced, and a conductive metal layer, i.e., a conductive pattern layer, is selectively formed on an electromagnetic wave-irradiated region.

In addition, in the above-described metal nuclei generation step, laser electromagnetic waves in a near infrared ray region may be emitted among the electromagnetic waves. For example, laser electromagnetic waves having a wavelength of 1,000 nm to 1,200 nm, 1,060 nm to 1,070 nm, or 1,064 nm may be emitted at an average power of 1 W to 20 W or 3 W to 10 W. Since emission conditions of electromagnetic waves such as a laser beam is set within this range, a metal nuclei and an adhesive surface including the same may be efficiently formed from an LDS additive. Thus, a good conductive pattern may be formed.

In addition, after the above-described metal nuclei generation step, as illustrated in the third step of FIG. 1, a step of forming a conductive metal layer by chemically reducing or plating a region, in which metal nuclei are generated, may be performed. After the reduction or plating step, a conductive metal layer may be selectively formed on a predetermined region in which metal nuclei and an adhesive surface are exposed. In the remaining regions, a chemically stable LDS additive, i.e., a non-conductive metal compound, may maintain non-conductivity. Accordingly, a fine conductive pattern is selectively formed only in a predetermined region on a substrate.

For example, in the reduction or plating step, the substrate in which metal nuclei are generated may be treated with an acidic or basic solution including a reducing agent. For example, the solution may include one or more selected from the group consisting of formaldehyde, hypophosphite, dimethylamine borane (DMAB), diethylamine borane (DEAB), and hydrazine as a reducing agent.

As another example, in the reduction or plating step, a resin product or a resin layer in which metal nuclei are generated may be treated with an electroless plating solution including a reducing agent and conductive metal ions. When the reduction or plating step is performed, metal ions included in metal nuclei are reduced, or in a region in which metal nuclei are generated, conductive metal ions included in an electroless plating solution are chemically reduced using the metal nuclei as seeds, so that a good conductive pattern is selectively formed in a region irradiated with electromagnetic waves. In this case, the metal nuclei and the adhesive surface strongly bind to the chemically reduced conductive metal ions.

A substrate in which the above-described conductive pattern layer is formed may be used as a built-in antenna of mobile phones, tablet PCs, and automobile parts.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Components used in Examples and Comparative Examples below are as follows.

(A-1) Polyphenylene sulfide: A linear polyphenylene sulfide resin having a melt index of 750 g/10 min (measured at 315° C./5 kg according to ASTM D1238) was used.

(A-2) Polyphenylene sulfide: A branched (cross-linked) polyphenylene sulfide resin having a melt index of 450 g/10 min (measured at 315° C./5 kg according to ASTM D1238) was used.

(B-1) Polyphthalamide: A PA6T/66 resin having a melting temperature of 305° C. to 310° C. and an intrinsic viscosity of 0.90 dl/g (according to ASTM D5225) was used.

(B-2) Polyamide: A PA6 resin having a relative viscosity of 2.0 to 5.5 and a number average molecular weight (Mn) of 20,000 g/mol to 500,000 g/mol was used. In this case, the PA6 resin was dissolved in a 96% sulfuric acid solution at 25° C., and then the relative viscosity thereof was measured.

(B-3) Polyamide: A PA66 resin having a relative viscosity of 2.0 to 5.5 and a number average molecular weight (Mn) of 20,000 g/mol to 500,000 g/mol was used. In this case, the PA66 resin was dissolved in a 96% sulfuric acid solution at 25° C., and then the relative viscosity thereof was measured.

(B-4) Polyethylene terephthalate: A JSB599 polyester resin was used.

(B-5) Polybutylene terephthalate: A semi-aromatic TH6082 product having a crystallization time ($t_{1/2}$) exceeding 750 seconds was used.

(c) Compatibilizer: Glycidyl methacrylate-grafted ethylene rubber was used.

(D) LDS additive: $Cu(Cr, Mn)_2O_4$ was used.

(E) Plating seed generation promoter: Di-pentaerythritol was used.

(F) Glass fiber: A glass fiber surface-treated with an epoxy silane-based compound having an average diameter of 10 μm to 13 μm and an average length of 3 mm to 4 mm was used.

(G) Mineral filler: Spherical calcium carbonate having a particle size of 5 μm to 6 μm was used.

Examples 1 to 8 and Comparative Examples 1 to 10

Components were fed into a super mixer according to the compositions shown Tables 1 and 2, additives including an antioxidant and a lubricant were added thereto in an amount of 0.4% by weight based on 100% by weight of a total composition, and mixing was performed. The mixture was melt-kneaded at 320° C. using a twin-screw extruder, extruded to obtain an extrudate, and then the extrudate was cut using a pelletizer to obtain pellets. Then, the pellets were dried at 120° C. for 4 hours or more and injection-molded at an injection temperature of 310° C. and a mold temperature of 120° C. to prepare a substrate of 100 mm×100 mm×2 mm size.

The prepared substrate was irradiated with a 1064 nm laser beam under conditions of 40 kHz and 1 W, 2 W, 3 W to 10 W using a G4 apparatus (SPI Co.) to activate the surface of the substrate. Then, the surface-activated substrate was subjected to the following electroless plating process.

A plating solution was prepared using MSMID-70 provided by MSC Inc., and the preparation process is as follows.

40 ml of a Cu solution (MSMID-70A), 120 ml of a complexing agent (MSMID-70B), 3.5 ml of an auxiliary complexing agent (MSMID-70C), and 2 ml of a stabilizer (MSMID-70D) were dissolved in 700 ml deionized water to prepare a Cu plating solution. 45 ml of 25% NaOH and 12 ml of 37% formaldehyde were added to 1 L of the prepared Cu plating solution to prepare a final plating solution.

The substrate, the surface of which was activated by a laser beam, was immersed in the plating solution for 3 to 5 hours, followed by washing with distilled water.

Test Examples

The properties of polyphenylene sulfide composition substrates, in which a conductive pattern layer was formed by electroless plating treatment in Examples 1 to 8 and Comparative Examples 1 to 10, were measured using the following methods, and the results are shown in Tables 1 and 2.

Figure 2A:
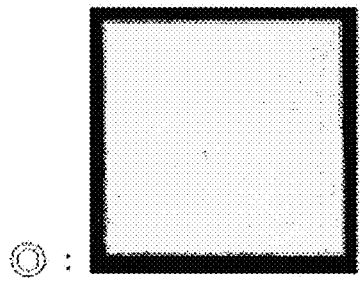
FIGS. 2A to 2C are images of various substrates evaluated as "plated (⊚)", "partially plated (o)", or "unplated (X)" according to the working Examples
Figure 2B:
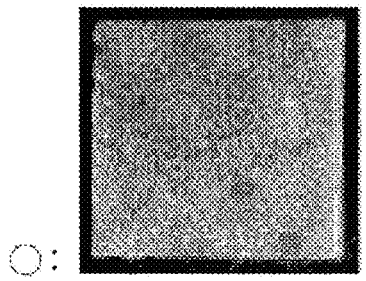
Figure 2C:
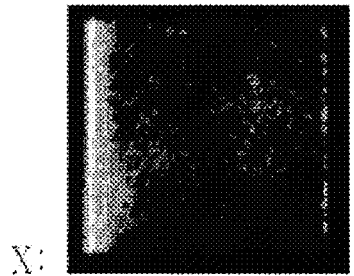

Plating degree (plating efficiency): The plating state of a substrate was judged by the naked eye and evaluated as "plated (⊙)", "partially plated (o)", or "unplated (X)". Images of substrates corresponding to each of the above-identified case are shown in FIGS. 2A to 2C.

Plating adhesion: The 10 mm×10 mm area of a plated substrate was plated and divided into 25 equal parts at 2 mm intervals. Then, a 3M tape was applied to the area and then peeled off, and the number of parts away from the substrate was counted. Based on the results, plating adhesion was evaluated as "good (⊙)", "normal (o)", or "poor (X)".

Plating precision: Plating degree for regions other than a laser-irradiated region was judged by the naked eye, and evaluated as "plating only in an irradiated region (⊙)", "a rough surface of a region other than an irradiated region is plated (o)", or "a smooth surface of a region other than an irradiated region is plated (X)". Permittivity (Dk) and dielectric loss (Df): The inner surface of a specimen was applied with silver paste of 3 cm in diameter, and the specimen was cured at 130° C. A Cp value and a D value were measured using a permittivity meter (Impedance Analyzer 4194A; HP Co.), and then Dk and Df were calculated.

TABLE 1

| (Unit: wt %) | Examples | | | | | | | |
|---|---|---|---|---|---|---|---|---|
| No. | 1 | 2 | 3 | 4 | 5 | 6 | 7 | 8 |
| A-1 | 54.1 | 54.1 | | | 53.6 | 53.6 | | |
| A-2 | | | 54.1 | 54.1 | | | 53.6 | 53.6 |
| D | 5 | 5 | 5 | 5 | 5 | 5 | 5 | 5 |
| E | 0.5 | 0.5 | 0.5 | 0.5 | 1 | 1 | 1 | 1 |
| F | 40 | 30 | 40 | 30 | 40 | 30 | 40 | 30 |
| G | | 10 | | 10 | | 10 | | 10 |
| Plating degree | ◎ | ◎ | ○ | ○ | ◎ | ◎ | ◎ | ◎ |
| Plating adhesion | ◎ | ◎ | ◎ | ◎ | ◎ | ◎ | ◎ | ◎ |
| Plating precision | ◎ | ◎ | ◎ | ◎ | ◎ | ◎ | ◎ | ◎ |
| Permittivity (Dk) | 4.9 | 5.3 | 4.9 | 5.3 | 5.0 | 5.3 | 5.0 | 5.3 |
| Dielectric loss (Df) | 0.006 | 0.006 | 0.006 | 0.006 | 0.006 | 0.006 | 0.006 | 0.006 |

TABLE 2

| (Unit: wt %) | Comparative Examples | | | | | | | | | |
|---|---|---|---|---|---|---|---|---|---|---|
| No. | 1 | 2 | 3 | 4 | 5 | 6 | 7 | 8 | 9 | 10 |
| A-1 | 54.6 | 54.6 | | | 49.6 | 49.6 | 47.6 | 47.6 | 47.6 | 47.6 |
| A-2 | | | 54.6 | 54.6 | | | | | | |
| B-1 | | | | | 5 | | | | | |
| B-2 | | | | | | 5 | 5 | | | |
| B-3 | | | | | | | | 5 | | |
| B-4 | | | | | | | | | 5 | |
| B-5 | | | | | | | | | | 5 |
| C | | | | | | | | 2 | 2 | 2 | 2 |
| D | 5 | 5 | 5 | 5 | 5 | 5 | 5 | 5 | 5 | 5 |
| F | 40 | 30 | 40 | 30 | 30 | 30 | 30 | 30 | 30 | 30 |
| G | | 10 | | 10 | 10 | 10 | 10 | 10 | 10 | 10 |
| Plating degree | X | X | X | X | ◎ | ◎ | ◎ | ◎ | ◎ | ◎ |
| Plating adhesion | — | — | — | — | ◎ | ◎ | ◎ | ◎ | ◎ | ◎ |
| Plating precision | — | — | — | — | X | X | X | X | ○ | ○ |
| Permittivity (Dk) | 4.9 | 5.3 | 4.9 | 5.3 | 5.6 | 5.4 | 5.5 | 5.3 | 5.1 | 5.4 |
| Dielectric loss (Df) | 0.006 | 0.006 | 0.006 | 0.006 | 0.007 | 0.009 | 0.009 | 0.010 | 0.009 | 0.008 |

As confirmed by the results in Table 1, compared to the injection-molded articles (Comparative Examples 1 to 10) not in accordance with the present invention, the injection-molded articles (Examples 1 to 8) including the polyphenylene sulfide resin composition of the present invention have excellent plating adhesion and plating precision and low dielectric loss without deterioration in the intrinsic properties, such as heat resistance, flame retardancy, and dimensional stability, of a polyphenylene sulfide resin. Specifically, in the case where di-pentaerythritol as the plating seed generation promoter of (E) is not included (Comparative Examples 1 to 10), a specimen is not plated. When an alloy is prepared using another resin, a selected region of a specimen is not plated, and a plating is partially formed on the periphery of the selected region or a rough surface. In addition, permittivity and/or dielectric loss are increased.

The invention claimed is:

1. A polyphenylene sulfide resin composition, comprising:
    (a) 25% to 75% by weight of a base resin;
    (b) 0.1% to 10% by weight of a laser direct structuring (LDS) additive;
    (c) 0.1% to 5% by weight of a plating seed generation promoter;
    (d) 10% to 60% by weight of a glass fiber; and
    (e) 0% to 40% by weight of a mineral filler, based on a total weight of the polyphenylene sulfide resin composition,
    wherein the base resin comprises 95% by weight or more of a polyphenylene sulfide resin based on a total weight of the base resin, and
    wherein the plating seed generation promoter is a polyol containing 4 or more hydroxyl groups.

2. The polyphenylene sulfide resin composition according to claim 1, wherein the LDS additive is a copper-containing oxide.

3. The polyphenylene sulfide resin composition according to claim 2, wherein the copper-containing oxide further comprises one or more selected from the group consisting of Sb, Cu, Pb, Ni, Fe, Sn, Cr, Mn, Ag, Au, and Co.

4. The polyphenylene sulfide resin composition according to claim 3, wherein the copper-containing oxide is $Cu(Cr, Mn)_2O_4$.

5. The polyphenylene sulfide resin composition according to claim 1, wherein the glass fiber is a glass fiber surface-treated with an epoxy silane-based compound.

6. The polyphenylene sulfide resin composition according to claim 1, wherein the glass fiber has an average diameter of 5 μm to 20 μm and an average length of 1 mm to 10 mm.

7. The polyphenylene sulfide resin composition according to claim 1, wherein the polyphenylene sulfide resin composition comprises the mineral filler in an amount of 5% to 40% by weight based on a total weight of the polyphenylene sulfide resin composition.

8. The polyphenylene sulfide resin composition according to claim 1, wherein the mineral filler comprises one or more selected from the group consisting of glass beads, kaolin, talc, mica, clay, calcium carbonate, calcium silicate, silicon carbide, aluminum oxide, and magnesium oxide.

9. The polyphenylene sulfide resin composition according to claim 1, wherein the polyphenylene sulfide resin is a linear polyphenylene sulfide resin.

10. The polyphenylene sulfide resin composition according to claim 1, wherein the polyphenylene sulfide resin composition further comprises 0.1% to 5% by weight based on a total weight of the polyphenylene sulfide resin composition of one or more selected from the group consisting of flame retardants; antioxidants; light stabilizers; chain extenders; reaction catalysts; releasing agents; pigments; dyes; antistatic agents; antimicrobials; processing aids; metal deactivators; fluorine-based anti-dripping agents; inorganic fillers excluding glass fibers and mineral fillers; friction-resistant agents; and abrasion-resistant agents.

11. An injection-molded article, comprising the polyphenylene sulfide resin composition according to claim 1.

12. The injection-molded article according to claim 11, comprising a conductive pattern layer.

13. The injection-molded article according to claim 12, wherein the injection-molded article is a built-in antenna.

14. A method of preparing a polyphenylene sulfide resin composition, the method comprising melt-kneading and extruding (a) 25% to 75% by weight of a base resin; (b) 0.1% to 10% by weight of a laser direct structuring (LDS) additive; (c) 0.1% to 5% by weight of a plating seed generation promoter; (d) 10% to 60% by weight of a glass fiber; and (e) 0% to 40% by weight of a mineral filler, based on a total weight of the polyphenylene sulfide resin composition, wherein the base resin comprises 95% by weight or more of a polyphenylene sulfide resin based on a total weight of the base resin, and wherein the plating seed generation promoter is a polyol containing 4 or more hydroxyl groups.

* * * * *